United States Patent [19]

Blaschke et al.

[11] 4,454,461
[45] Jun. 12, 1984

[54] APPARATUS FOR THE CONTROL OF A SALIENT-POLE MACHINE

[75] Inventors: Felix Blaschke; Theodor Salzmann, both of Erlangen, Fed. Rep. of Germany

[73] Assignee: Siemens Aktiengesellschaft, Berlin and Munich, Fed. Rep. of Germany

[21] Appl. No.: 378,860

[22] Filed: May 17, 1982

[30] Foreign Application Priority Data

May 25, 1981 [DE] Fed. Rep. of Germany ....... 3120797
May 25, 1981 [DE] Fed. Rep. of Germany ....... 3120768

[51] Int. Cl.³ .............................................. H02P 5/40
[52] U.S. Cl. .................................... 318/717; 318/723; 318/803
[58] Field of Search ...................... 318/717, 721–723, 318/803, 807–811

[56] References Cited

U.S. PATENT DOCUMENTS 4,276,505  6/1981  Bose ..................................... 318/717
4,651,419  9/1984  Takahashi ............................ 318/721

Primary Examiner—David Smith, Jr.
Attorney, Agent, or Firm—Karl F. Milde, Jr.; Andrew G. Rodau

[57] ABSTRACT

Apparatus for controlling a salient-pole machine includes a stator current control element to make the stator current $\underline{i}^S$ follow preset desired values $\underline{i}_\phi^{S*}$. A field current control element develops from preset desired flux values $\psi^*$, from the flux signal output of a flux computer (direction $\phi_L$) and from an inductance parameter (the shunt inductance $X_q$ of the machine) a fictitious field current value signal $i_0^{E*}$, which represents the field current value which would be used to control a hypothetical nonsalient-pole machine. This signal $i_0^{E*}$ is modified by a correction factor derived from the product of the longitudinal component of the flux $\psi_d$ (from the flux computer) and the different between the reciprocals $((1/X_q)-(1/X_d))$ of the shunt and series inductances of the machine, to give a field current control signal that accounts for the asymmetry of the salient-pole machine.

19 Claims, 11 Drawing Figures

APPARATUS FOR THE CONTROL OF A SALIENT-POLE MACHINE

BACKGROUND OF THE INVENTION

1. Field of the Invention

The invention relates to apparatus for the control of a salient-pole machine.

2. Description of the Prior Art

U.S. Pat. No. 3,775,649 describes a device for controlling a converter-fed, automatically controlled synchronous machine in which the desired value for the stator current (regarded as a vector) is preset in the form of a component parallel to the flux vector and a component normal thereto. In this field-oriented system, the field-parallel component determines the contribution of the stator current to the magnetizing current and can, in particular, be set to zero. For a given flux, the field-perpendicular component determines the electrical torque furnished by the machine and can, in particular, be used, for controlling or regulating the speed of rotation or the torque.

To this end, the desired stator current vector preset by these "field-oriented" components is transformed in a vector rotator according to the angle (flux angle $\phi_s$) between the flux vector and a fixed stator axis into a fixed ("stator-oriented") coordinate system, and is divided over the machine terminals, so that the stator current can now be controlled or regulated to this desired vector. The information about the flux angle $\phi_s$ is formed by a flux computer, which is fed by the actual value of the rotor position angle $\lambda_s$, as well as by the actual values for the field current and for the stator current. The flux computer solves the differential equations of the electrical part of the machine using fed-in machine parameters for the rotor resistance and for the main inductance. In the case of a nonsalient-pole synchronous machine, whose main inductance is rotation-symmetrical, only one inductance parameter is needed. In the case of a salient-pole machine, the relationship between the flux and the current of the machine, given by the main inductance, is dependent on the relative position of the flux to the rotor magnetic axis and must therefore be separated into a series inductance acting on the flux component parallel to the rotor axis and a shunt inductance acting on the perpendicular flux component. Thus, calculations to solve the aforementioned diffential equations must be carried out using a main inductance which varies with the flux angle. The flux computer described in U.S. Pat. No. 3,775,649 constitutes a mathematical model of the machine and operates in the rotor-oriented reference system, in which the field current is parallel to the rotor- or d-axis. In principle, the flux vector may also be picked up directly by Hall probes or may be determined using another mathematical model, such as is described e.g. in FIG. 5 of commonly-owned, copending U.S. Pat. app'n Ser. No. 279,352, now U.S. Pat. No. 4,388,577, entitled "Rotating Field Machine Drive", filed July 1, 1981. This model operates in the field-oriented coordinate system with a uniform main inductance, and therefore applies only to nonsalient-pole machines. Another possibility for determining the flux, also described in U.S. pat app'n Ser. No. 279,352, now U.S. Pat. No. 4,388,577 is to calculate the EMF of the machine from motor voltage and motor current and to obtain the flux therefrom by integration ("voltage model"). Not only is it possible to use the information furnished by these mathematical models about the flux vector for field-oriented regulation of the stator current, but the model flux magnitude can be made use of for maintaining the flux magnitude at a constant desired value through regulation of the field current.

It has been proposed in U.S. Pat. No. 3,896,351 to precontrol the field current instead of, or in addition to, regulating the flux. By dividing the desired flux value by the main inductance and subtracting the field-parallel portion of the desired stator current vector, the field-parallel component $i^{E*}\cdot\cos\phi_L$ of the desired field current vector is formed, which (vector) after division by $\cos\phi_L$ determined by the mathematical model constitutes a control input $i^{E*}$ for the magnitude of the field current. By this anticipatory control, therefore, the field current is available at the start in such a way that, considering the magnetizing portion $i_{\phi 1}{}^S$ of the stator current, the total flux flow is already made to follow the value belonging to the present desired flux value $\psi^*$. If from the model flux and the desired flux magnitude there is formed additionally the control deviation of a flux control, this control serves only to make the field current follow with high dynamic accuracy also in the case of rapid changes.

The relationship $i^\mu = X\cdot\psi$ utilized for the magnetizing current $i^\mu$ (field-parallel component of the total flux flow), main inductance X and flux magnitude $\psi$ is valid only for constant inductance, so that such anticipatory control cannot be used for a salient-pole machine for which the main inductance is asymmetrical.

SUMMARY OF THE INVENTION

It is an object of the present invention to provide control apparatus that makes it possible also for a salient-pole machine to adjust the flux to a desired preset flux value with high dynamic accuracy by means of suitable anticipatory control of the field current. This makes a separate flux control either completely superfluous, or at least aids it through anticipatory control of the field current to the extent that any remaining small flux deviations are quickly eliminated. According to the invention, apparatus for the control of a salient-pole machine includes circuitry for first forming a fictitious field current value representing the field current value which would be developed in response to a preset desired flux value for the control of a hypothetical nonsalient-pole machine having parameters similar to those of the salient-pole machine. The resulting fictitious field current is then modified by means of circuit elements that develop a correction factor to compensate for the deviation of the actual salient-pole machine from the fictitious nonsalient-pole machine, to give a modified field current value usable to control the salient-pole machine.

In preferred embodiments of the invention, discussed in greater detail below, the fictitious field current value is determined by neglecting the asymmetry of the main field inductance and calculating the fictitious value using only the shunt inductance as an inductance parameter input. The correction factor used to modify the fictitious value is developed from the longitudinal component of the flux (determined by a flux computer) and the shunt and series inductance parameters of the salient-pole machine. A preferred correction factor is determined by taking the product of the longitudinal flux component and the difference in the reciprocals of the two inductance parameters.

There have thus been outlined rather broadly the more important objects, features and advantages of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

Embodiments of the invention have been chosen for purposes of illustration and description, and are shown in the accompanying drawings forming a part of the specification, wherein.

Like elements are referred to by like numerals throughout the drawings.

DESCRIPTION OF THE PREFERRED EMBODIMENTS

Figure 1:
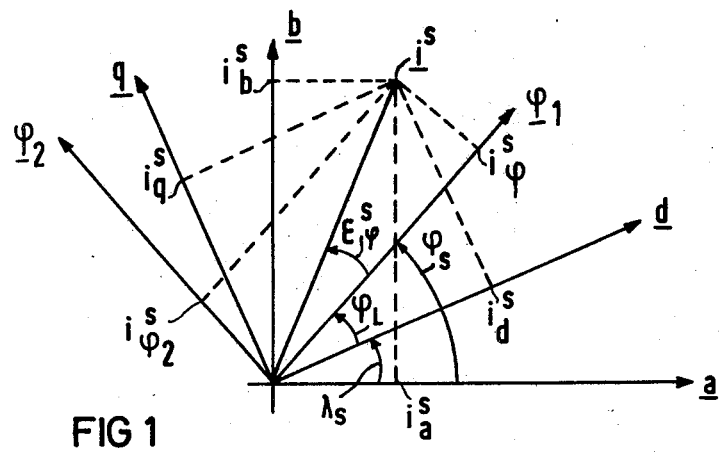
FIG. 1 is a vector representation of a stator current $i^S$ in stator-oriented (a, b), rotor-oriented (d, q) and field-oriented ($\phi_1$, $\phi_2$) reference systems.

As shown in FIG. 1, the stator current vector $i^S$ (current magnitude $i^S$) of a salient-pole machine can be represented by two coordinates ($i_a{}^S$, $i_b{}^S$) in a spatially fixed stator-oriented reference system established by the unit vectors a, b. For reference purposes, the stator-oriented representation of the vector $i^S$ is denoted by $i_S{}^S = (i_a{}^S, i_b{}^S)$.

Similarly, the vector $i^S$ can be represented by the coordinates ($i_d{}^S$, $i_q{}^S$) in a rotor-oriented reference system established by the axes d, q. The machine rotor rotates with respect to the stator and thus has a time-varying rotor position angle $\lambda_S$ relative to the fixed axis a. The rotor axes d, q thus constitute a coordinate system rotated relative to the axes a, b by the angle $\lambda_S$. The position of the d axis in the stator-oriented reference system is described by a vector $\underline{\lambda}_S$ having the stator-oriented Cartesian coordinates (cos $\lambda_S$, sin $\lambda_S$). For reference the rotor-oriented representation of the vector $i^S$ is denoted by $\underline{i}_L{}^S = (i_d{}^S, i_q{}^S)$.

The flux itself is described by a vector $\underline{\psi}$ which in addition to a magnitude $\psi$ has a flux angle $\phi$. The stator current vector $i^S$ can thus also be represented in a field-oriented Cartesian reference system established by a field-parallel reference vector $\underline{\phi}_1$ and a field-orthogonal reference vector $\underline{\phi}_2$. The vector $\underline{\psi}$ is rotated with respect to the rotor axis d by an angle $\phi_L$. The reference system $\underline{\phi}_1$, $\underline{\phi}_2$ is rotated relative to the rotor-oriented reference system d, q by the rotor-oriented flux angle $\phi_L$, and relative to the stator-oriented reference system a, b by the stator-oriented flux angle $\phi_S$. As seen from FIG. 1, $\phi_S = \lambda_S + \phi_L$. Unit vectors $\underline{\phi}_L = (\cos \phi_L, \sin \phi_L)$ and $\underline{\phi}_S = (\cos \phi_S, \sin \phi_S)$ can be defined to represent the respective positions of the flux vector in the rotor-oriented and stator-oriented reference systems. The field-oriented representation of the vector $i^S$ is denoted as $\underline{i}_\phi{}^S = (i_{\phi 1}{}^S, i_{\phi 2}{}^S)$. Since $\underline{i}_S{}^S$, $\underline{i}_L{}^S$ and $\underline{i}_{100}{}^S$ are merely different representations of the same vector $i^S$, the vector magnitude $i^S$ is the same in each reference system, and can be expressed as:

$$|\underline{i}_L{}^S| = |\underline{i}_\phi{}^S| = |\underline{i}_S{}^S| = i^S.$$

Figure 2:
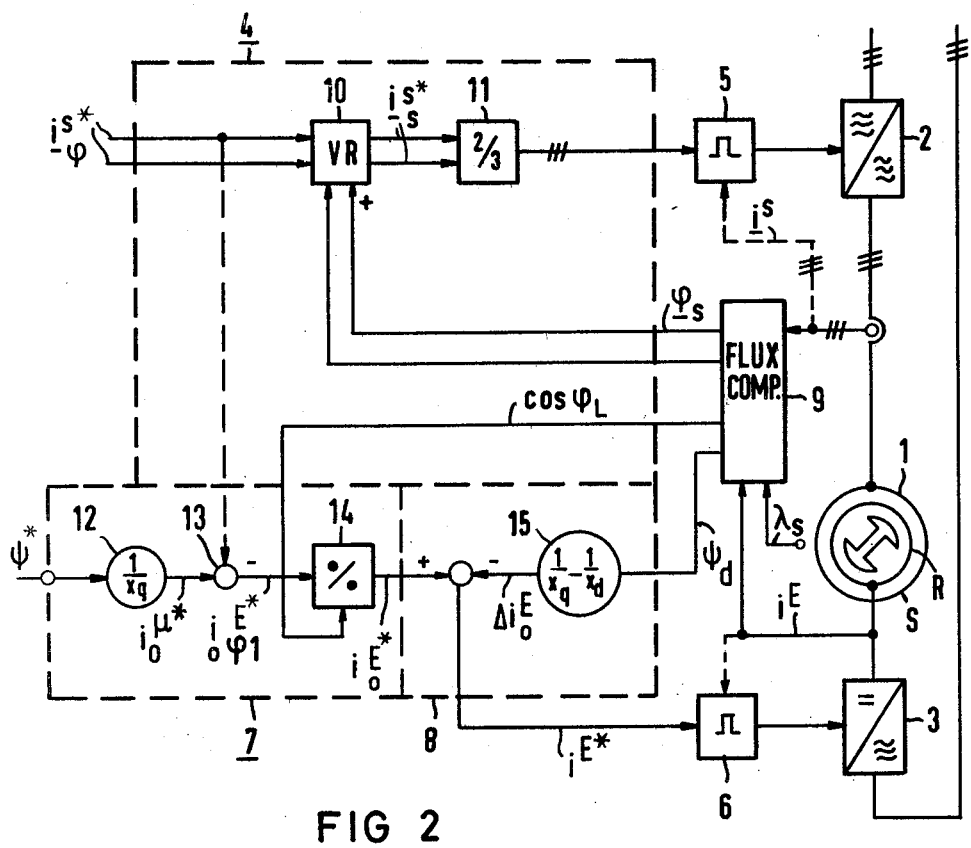
FIG. 2 is a schematic view of a salient-pole machine and control apparatus formed in accordance with the invention.

Referring to FIG. 2, the stator winding S of a salient-pole machine 1 is supplied with alternating current (three-phase current) via a power converter 2 and the rotor R is supplied with direct current via a rectifier 3. The desired value input for the stator current is designated by a desired stator current vector $\underline{i}^{S*}$, which is advantageously preset in field-oriented coordinates ($\underline{i}_\phi{}^{S*}$). The preset field-oriented coordinate signals serve as inputs to a control system 4 which forms control voltages therefrom which act as a control input for the stator current by driving a stator current control device 5 to operate on the values of the power converter 2.

The power converter 2 and the control device 5 form the final control element for the stator current $i^S$. Similarly, the rectifier 3 and a field control current device 6 are the final control elements for the field current $i^E$. The control devices 5 and 6 will generally comprise current regulators and are connected to receive as inputs the actual values of $i^S$ and $i^E$.

The preset input magnitude $i^{E*}$ for the field current control element 6 is formed by a field current control element 7 and an anticipatory control stage 8. Further, a circuit model of the machine 1 consisting of a flux determining system 9 is provided which receives as input signals the actual values for the field and stator currents $i^E$, $i^S$ and the rotor angle $\lambda_S$ developed by a rotor position transmitter. To convert the desired stator current value $\underline{i}_\phi{}^{S*}$ (field-oriented current angle $\epsilon_\phi{}^{S*}$) preferably given in field-oriented form, into appropriate control inputs, the flux determining system 9 provides the stator-oriented flux angle $\phi_S$ (represented, for instance, by a vector $\underline{\phi}_S$) to a vector rotator 10. The vector rotator 10 acts on the desired current vector $\underline{i}_\phi{}^{S*}$ in such a way that the reference system of the vector $\underline{i}^{S*}$ is rotated back the the angle $\phi_S$ and thus the desired stator current vector (corresponding to a stator-oriented current angle $\epsilon_S{}^{S*} = \epsilon_\phi{}^{S*} + \phi_S$) is now furnished in its stator-oriented coordinate system. The desired stator-oriented vector $\underline{i}_S{}^{S*}$ is then divided in a "⅔-converter component" 11 into three components which are mutually shifted by 120° that serve as control voltage inputs to the stator current control device 5 which controls the three phases of stator current that are delivered to the stator winding S. The vector rotator 10, the component converter 11, and the control device 5 may take the form of the corresponding element shown in FIGS. 3–5 and 7 of U.S. Pat. No. 3,775,649.

The desired flux value input to the field current control element 7 is preset in the form of its magnitude $\psi^*$. When the main inductance X of a synchronous machine 1 is known, the respective magnetizing current $i^{\mu^*}=\psi^*$ can be formed in accordance with the relationship $\psi = X \cdot i^\mu$. The magnetizing current is the field-parallel component of the total flux flow required for build-up of the field. The total flux flow is composed of the stator current $i^S$, the field current $i^E$ and the damping current $i^D = (1/R^L) \cdot (d\psi/dt)$ (where $R^L$ is the rotor resistance), the field current being parallel to the d-axis ($i_d{}^E = i^E$, $i_q{}^E = 0$) and the damping current at constant flux magnitude being perpendicular to the field axis ($i_{\phi 1}{}^D = 0$, $i_{\phi 2}{}^D = i^D$).

In a nonsalient-pole machine the longitudinal component $X_d$ and the transverse component $X_q$ of the main inductance are identical ($X = X_q = X_d$). The field-parallel component $i_{\phi 1}{}^{E^*} = i^{E^*}\cos\phi_2$ of the desired exciting current $i^{E^*}$ can be formed by subtracting (at subtraction point 13) the field-parallel component of the desired $i_{\phi 1}{}^{S^*}$ or actual $i_\phi{}^S$ value of the stator current from the desired magnetizing current value $i_o{}^\mu = \psi^*/X_q$ (determined at proportional stage 12). The effect of the stator current can, however, be ignored when the influence of the field-parallel stator current component is negligible (i.e. when $i_{\phi 1}{}^{S^*} = 0$). The resulting desired value for the field current magnitude $i^{E^*}$ can thereafter be formed by dividing the field-parallel component $i_{\phi 1}{}^{E^*}$ by $\cos\phi_L$, the magnitude of which is obtained from the flux determining member 9.

The field-current element 7 will determine the correct desired field current value only for a non salient-pole machine ($X = X_q = X_d$). In accordance with the invention, a desired field current value is also produced by the control element 7 (FIG. 2) for a salient-pole machine. This is done by neglecting the asymmetry of the main field inductance and providing only the shunt inductance of the salient-pole machine $X_q$ as an inductance parameter input correlated with the main inductance. The resulting field current value $i_{o\phi 1}{}^{E^*}$ is only a fictitious desired field current value because the asymmetry is neglected. Consequently, the developed values for magnetizing current and each field current, which would be correlated with the preset desired flux value $\psi^*$ only in a nonsalient-pole machine, are also fictitious ($i_o{}^{\mu^*}$ and $i_o{}^{E^*}$).

Figure 3:
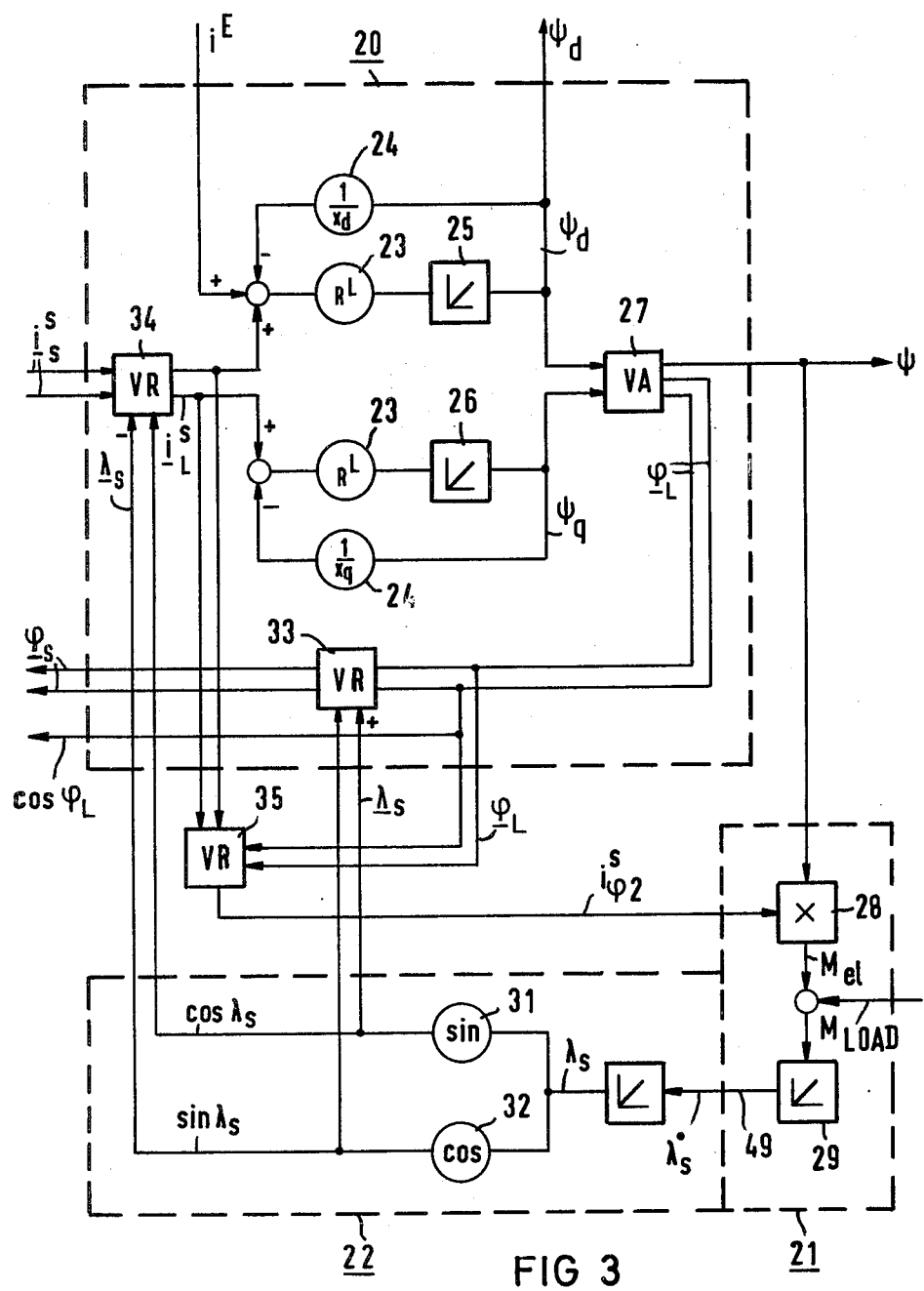
FIG. 3 is a schematic view of a model of a salient-pole machine usable for flux determination with the apparatus of FIG. 2.

According to the invention, the field current value $i_o{}^{E^*}$ is regarded as a first approximation for the desired field current value $i^{E^*}$. The anticipatory control stage 8, which connects to the field current control element 7, serves to form the input variable $i^{E^*}$ for the field current control device 6 from the first approximation $i_o{}^{E^*}$ of the field current value and from a correction factor $\Delta i_o{}^E$. The correction factor is developed from the longitudinal component of the flux $\psi_d$ (determined by means of the flux determining system 9) and from the salient-pole machine parameters for the shunt inductance $X_q$ and the series inductance $X_d$ (see further discussion below). A preferred correction factor is determined, as shown in FIG. 2, by a calculation component 15 which develops an output signal based on the product of the longitudinal component of the flux times the difference between the reciprocals of the shunt and series inductance parameters, $\Delta i_o{}^E = \psi_d \cdot (1/X_q - 1/X_d)$. An equivalent circuit for an embodiment of the flux determining system 9 and the synchronous machine 1 of FIG. 2 is shown in FIG. 3. The equivalent circuit comprises an electrical part 20, a mechanical part 21 and a vector oscillator 22. The oscillator 22 causes the reaction of the rotor speed $\lambda_S$ on the electrical part of the machine. In the electrical part 20, the flux $\psi$ is formed by integration of the damping current $i^D = 1/R_L(d\psi/dt)$ in the rotor-oriented coordinates. Adjustment of the rotor resistance $R^L$ can be done at the proportional stages 23 and adjustment of the reciprocal parameters $X_d$, $X_q$ of the inductance (instead of the reciprocal inductance) can be done at the proportional stages 24. Integration is performed by the integrators 25 and 26. The stages 23, 24 and integrators 25, 26 develop a flux model value $\psi$ in terms of its rotor-oriented components ($\psi_d$, $\psi_q$) from which a vector analyzer 27 forms the flux magnitude $\psi$, as well as the rotor-oriented flux angle $\phi_L$ in the form of the direction vector $\underline{\phi}_L = (\cos\phi_L, \sin\phi_L)$.

The electrical torque $M_{el}$ of the machine is formed by the multiplier 28 from the product of the flux magnitude $\psi$ and the field-normal stator current component $i_{\phi 2}{}^S$. The difference between the electrical torque and the torque $M_{load}$ caused by the connected mechanical load determines the rotor acceleration, from which the rotor speed $\lambda_S$ is obtained by integration (output of an integrator 29).

The rotor speed $\lambda_S$ is then again integrated by an integrator 30 to give the rotor position angle $\lambda_S$. The functions $\cos\lambda_S$ and $\sin\lambda_S$ are then formed by function formers 31, 32.

The unit vector $\underline{\phi}_L$ furnished by the vector analyzer 27 is then rotated by means of a vector rotator to point in the field direction, according to the relationship $\phi_S = \phi_L + \lambda_S$. Rotation by the rotor position angle $\lambda_S$ into the stator-oriented reference system, gives the stator-oriented flux angle $\phi_S$, or respectively the direction vector $\underline{\phi}_S$ thereof. The outputs ($\cos\lambda_S$, $\sin\lambda_S$) of the function formers 31, 32 defining $\lambda_S$ are also used by a vector rotator 34 (FIG. 3) to transform the current vector $i_S{}^S$ preset in stator-oriented form into the rotor-oriented current vector $i_L{}^S$ required for the solution of the differential equations. From the vector $i_L{}^S$ the field-normal stator current component $i_{\phi 2}{}^S$ required for the formation of the electrical torque $M_{el}$ can be calculated by means of a vector rotator 35.

Of the structural configuration of the entire synchronous machine shown in FIG. 3, only the electrical part 20 is needed for the flux determination and is simulated in the model. The rotor frequency $\lambda_S$ can be picked directly off the machine 1 at the rotor axis by means of a tachometer generator. Thus, unless the electrical torque $M_{el}$ is needed for torque control, the elements 28, 29 and 35 of FIG. 3 may be omitted. Instead of the vector oscillator 22, other circuitry may be used that contains sine generators controlled by a voltage proportional to $\lambda_S$ and that generates two output signals phase-shifted with respect to each other by 90°. The information about the flux and its direction $\phi_L$ required for field-oriented machine control is effectively supplied only by the electrical model circuit 20, it being also possible (as shown in FIG. 4) to use the desired values instead of the actual values used in FIGS. 2 and 3.

Figure 4:
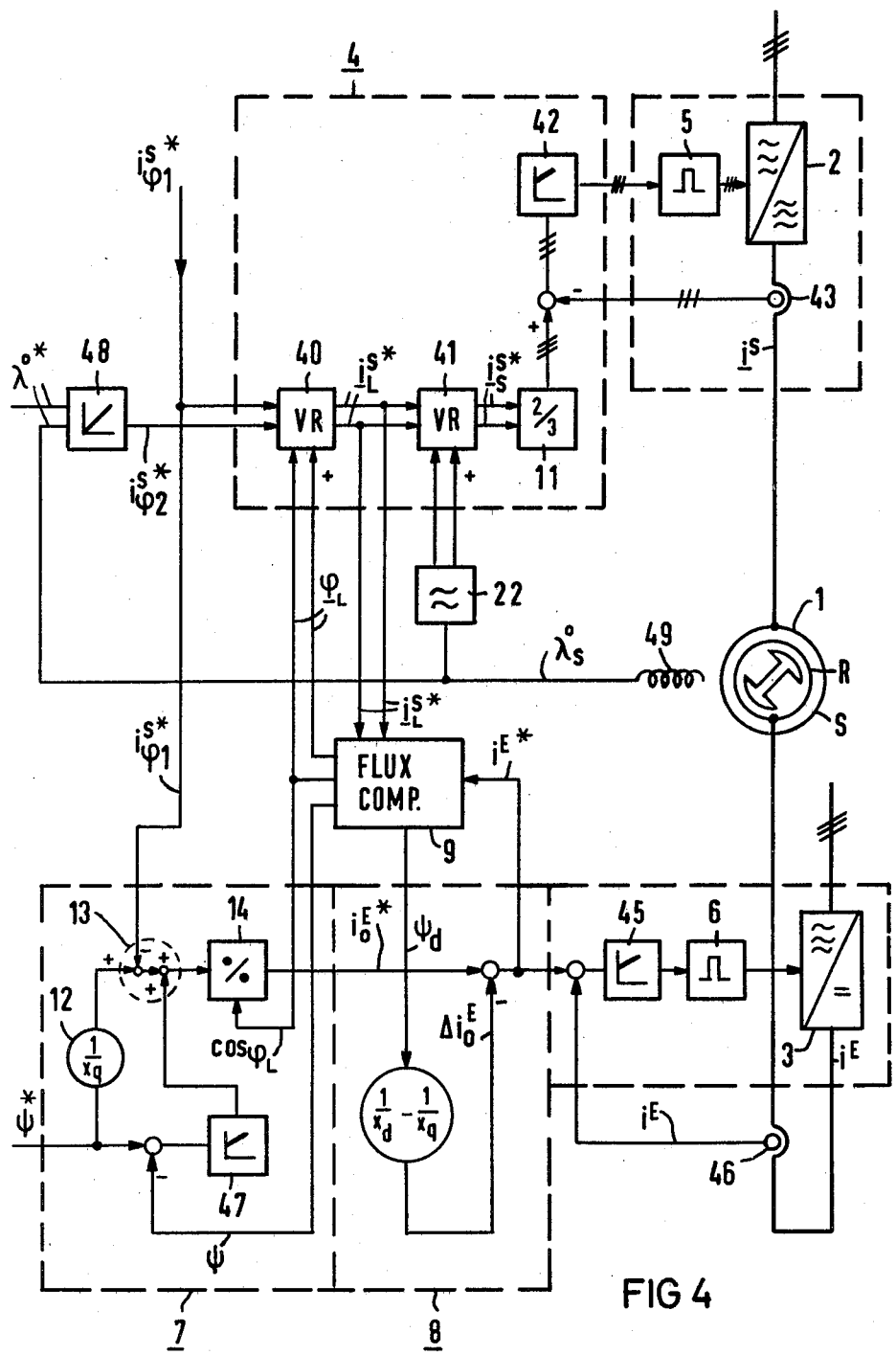
FIG. 4 is a schematic view of a salient-pole machine and a modified form of the control apparatus of FIG. 2.

A modified form of control apparatus is shown in FIG. 4. In the arrangement shown in FIG. 4, the desired stator current value $i_\phi{}^{S^*}$ is again preset as an input to the stator current control system 4, given in terms of its field-oriented components $i_{\phi 1}^{S*}$ $i_{\phi 2}^{S*}$. Two vector rotators 40 and 41 serve to rotate the desired stator current vector $i_\phi^{S*}$ successively by the rotor-oriented flux angle $\phi_L$ and the rotor position angle $\lambda_S$, and to thereby transform it into the desired stator-oriented vector $i_S^{S*}$. The desired vector $i_L^{S*}$ preset in rotor-oriented coordinates produced at the output of the rotator 40 is also connected to be delivered as an input to the flux determining system 9. Since the stator-oriented flux angle $\phi_S$ is not needed, the flux determining system 9 may, for example take the form of the electrical model circuit 20 (without the vector rotators 33 and 34), discussed above in connection with FIG. 3.

As in the embodiment of FIG. 2, the ⅔ component converter 11 divides the two components of the stator-oriented vector $i_S^{S*}$ into three 120° phase-shifted components. In addition, a regulator 42 is provided which makes the phase currents sensed by a measuring member 43 (corresponding to the vector $i^S$) follow the desired values obtained at the output of the component converter 11. Likewise, a field current regulator 45 is provided connecting the control device 6, to make the actual field current value $i^E$ sensed by a measuring member 46 follow the field current value $i^{E*}=i_0^{E*}+\Delta_0 i^E$ determined and corrected in the control element 7 and the control stage 8. If the regulator 45 works accurately enough so that $i^E=i^{E*}$, then the actual value $i^E$ can be used instead of the desired field current value $i^{E*}$ as an input to the flux determining system 9. The important thing is that, when using the electrical model circuit 20 of FIG. 3 as the system 9, the actual or desired value input is the field current compensated by the correction factor, i.e. the "true" field current.

The field current control element 7 in the embodiment of FIG. 4 includes a flux regulator 47 which is connected to receive as its input, the deviation of the preset desired flux value $\psi^*$ from the flux magnitude $\psi$ determined by the model circuit 9. The regulated deviation output of the regulator 47 is connected as a correcting influence on the subtraction point 13, at which the field-parallel component of the disturbed field current $i_{0\phi 1}^{E*}=\psi^*/X_q-i_{\phi 1}^{S*}$ is formed. With the control of the field current according to the invention, the output signal of the field current regulator 45 is already practically constant. The flux regulator 47 is thus already relieved to such an extent that it can be eliminated as a practical matter, if desired, without significant deterioration in performance.

The arrangement of FIG. 4 is completed by a rotational speed regulator 48, to which are fed as an actual value input the rotor speed $\lambda_S$ sensed at the shaft and a corresponding desired rotational speed value input $\lambda^*$. The regulator output signal furnishes the desired value $i_{\phi 2}^{S*}$ for the field-normal component of the desired field current vector $i_\phi^{S*}$. Transformation of the rotational speed $\lambda_S$ into the vector $\lambda_S$ describing the rotor position is explained above in connection with the vector oscillator 22 of FIG. 3. The rotor speed $\lambda_S$ is sensed directly by a tachometer generator 49, instead of being simulated by the mechanical part 21.

Figure 5:
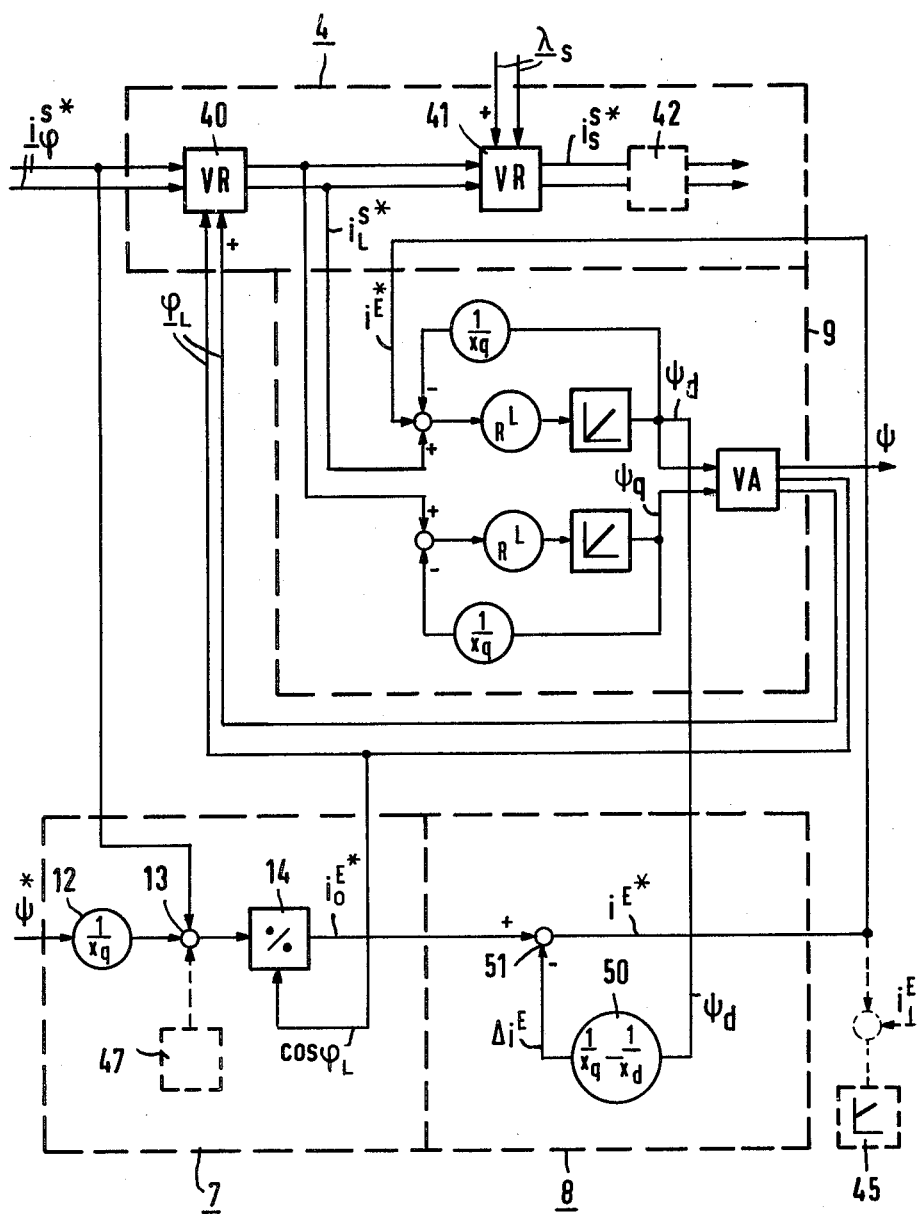
FIG. 5 is a schematic view of a further modified form of control apparatus according to the invention having a flux determining system operating in the rotor-oriented reference system.

FIG. 5 illustrates the use of the circuit model 9 as a flux-determining system in conjunction with the circuit groups 4, 7 and 8 of the embodiment of FIG. 4. The regulators 42, 45 and 47 (FIG. 4) are shown in broken lines, the regulator 45 being able to be provided with so short a control time that the actual field current value $i^E$ and desired field current value $i^{E*}$ are practically identical. The operation of the regulator 42 is of little importance to the further discussion of the control operation, and, as already stated above, the regulator 47 is relieved by the anticipatory control 8 to such an extent that it can be omitted practically without impairment of the performance of the entire arrangement.

The essence of the invention can be understood with reference to the equivalent circuit of FIG. 5. First there is formed from the quotient $\psi^*/X_q$ (elements 12, 13, 14) a fictitious (i.e. first approximation) field current value $i_0^{E*}$. The deviation of the fictitious value from the actual value is then practically fully compensated for by the correspondingly selected correction factor $\Delta i_0^E$.

As the field current has only one d-component, the field current belonging to a given flux at given stator current can be written, in terms of the damping current, as $R^L \cdot i^D = d\psi/dt$:

$$i^E = i_d^\mu - i_d^S - \frac{1}{R^L} \cdot \frac{d\psi_d}{dt}$$

with the aid of the relationships, $$\frac{1}{X_d} = \frac{1}{X_q} - \frac{1}{X_q} + \frac{1}{X_d} \text{ and } \frac{1}{X_d} \cdot \psi_d = i_d^\mu;$$

it follows that $$i^E = \underbrace{\frac{1}{X_q} \cdot \psi_d - i_d^S - \frac{1}{R^L} \cdot \frac{d\psi_d}{dt}}_{i_0^E} - \underbrace{\left(\frac{1}{X_q} - \frac{1}{X_q}\right) \cdot \psi_d}_{\Delta i^E}$$

Here, $i_0^E$ is the fictitious field current corresponding to the flux $\psi$, to the stator current $i^S$ and to the main field inductance $X_q$, of a fictitious nonsalient-pole machine ($X=X_q$), the fictitious magnetizing current of which is given by the field-parallel component of the sum of the fictitious field current plus the stator current, so that for the case of the flux being controlled to a constant magnitude:

$$\frac{\psi}{X_q} = i_0^\mu = (i_0^E \cos\phi_L + i_{\phi 1}^S).$$

Hence the desired flux value $\psi^*$ has a corresponding desired field current magnitude given by the relationship:

$$i^{E*} = \left(\frac{\psi^*}{X_q} - i_{\phi 1}^S\right) / \cos\phi_L - \Delta i^E$$

or a field current vector whose components determined (infield-oriented terms) are as follows:

$$i_{\phi 1}^{E*} = \frac{\psi^*}{X_q} - i_{\phi 1}^S - \Delta i^E \cdot \cos\phi_L,$$

$$i_{\phi 2}^{E*} = \left(\frac{\psi^*}{X_q} - i_{\phi 2}^S\right) \frac{\sin\phi_L}{\cos\phi_L} - \Delta i^E \cdot \sin\phi_L$$

The circuitry for realizing these relationships comprises the elements 7 and 8, discussed above with reference to FIGS. 2, 4 and 5.

As can be seen by the foregoing analysis, an important result of using a fictitious field current value technique is that the effect of neglecting inductance asymmetry is merely to introduce an error which acts only on the determination of the true field current and which can easily be corrected by means of a correction factor based solely on an asymmetrical machine parameter and the actual flux (which in principle may be determined directly by Hall probes). This is surprising. It was not expected that the flux corresponding to a particular stator current, instantaneous rotor angle, flux angle and fictitious field current value could be represented as a simple function of the true flux and the field current or as a function of other variables ordinarily determined anyway for a field-oriented operation. Thus, it was thought that the correction factor needed to correct the deviation of the field current from the true field current would have to be a complicated function of many variables describing the instantaneous operational state and might only be able to be represented approximately.

Figure 6:
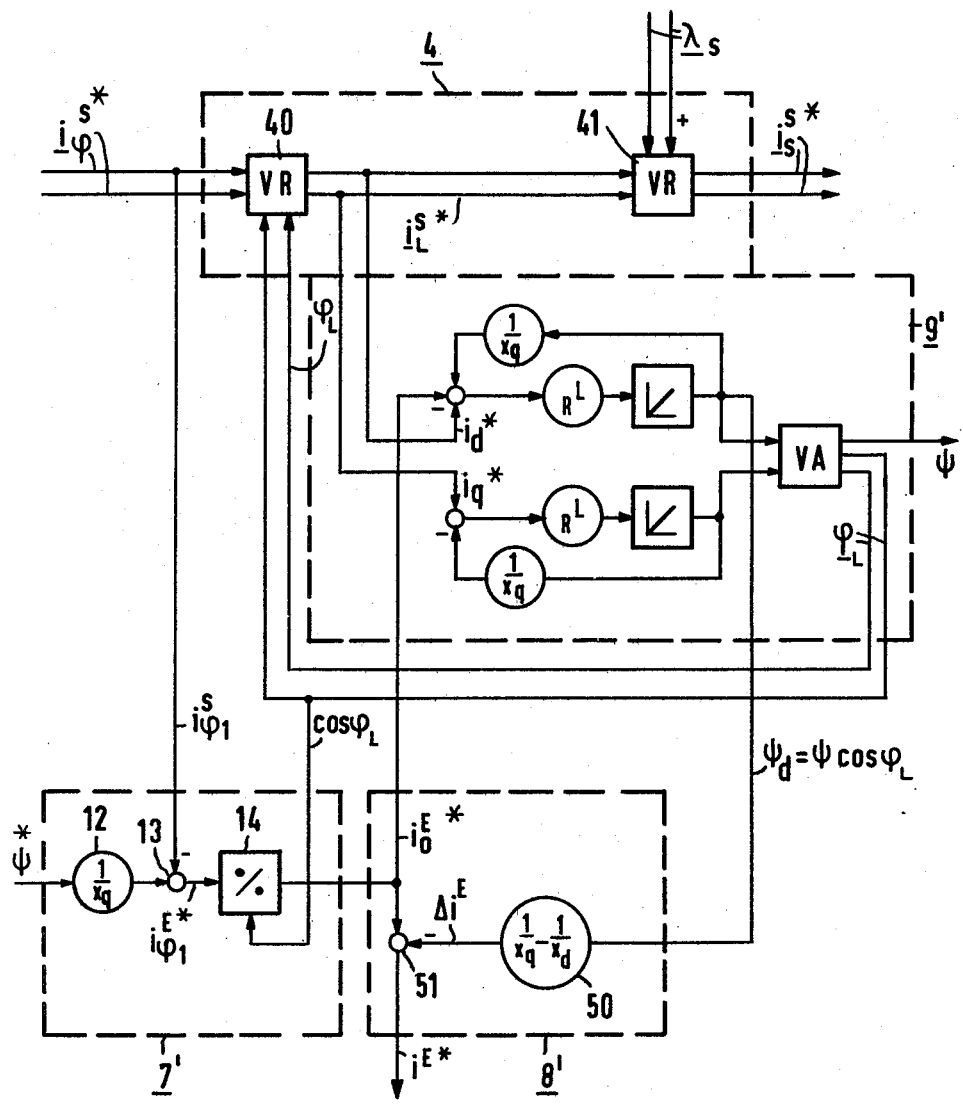
FIG. 6 is a modified form of the apparatus of FIG. 5.

As the field current value $i_0^{E^*}$ is the fictitious field current of a nonsalient-pole machine corresponding to the desired flux value $\psi^*$, the arrangement of FIG. 5 can be further simplified as shown in FIG. 6 by replacing the circuit model of the salient-pole machine as the flux determining system, by a circuit model of a nonsalient-pole machine having $X = x_q$ and using the fictitious field current value $\rho^{E^*}$ instead of the true actual or desired field current value.

The modified flux determining system 9' shown in FIG. 6 simulates a flux model value $\phi_L$ from input values for the stator current $i_\phi^{S^*}$, the rotor resistance $R^L$ and an inductance parameter correlated with the main inductance as well as for a field current value. In accordance with the invention, a parameter correlated with a nonsalient-pole machine is used as the inductance parameter. Preferably, as in the illustrated case, the shunt inductance $X_q$ of the salient-pole machine is used. The fictitious field current $i_0^{E^*}$ is used as the input field current value (see FIG. 6).

The fictitious field current value $i_0^{E^*}$ is determined by the preconnected computing element 7' from the preset flux $\psi^*$, the inductance parameter $X_q$ and the preset current $i_\phi^{S^*}$ (for the embodiment of FIG. 6 only the field-parallel component $i_{\phi 1}^{S^*}$ is needed). In the control stage 8' the quantity $i^{E^*}$, corresponding to the flux $\psi^*$, of the true field current is determined from the fictitious field current value $i_0^{E^*}$ and the correction factor $\Delta i^E$, derived from the flux model value $\psi$ (in FIG. 6 only the rotor-oriented longitudinal component $\psi_d$ is used) and the parameters for the series inductance $X_d$ and shunt inductance $X_q$.

The correction factor $\Delta i^E$ is formed for the circuit of FIG. 6 by the proportional stage 50 as the product $[(1/X_q) - (1/X_d)] \cdot \psi_d$ and is negatively applied to $i_0^{E^*}$ at the subtraction stage 51.

The elements 7', 8' and 9' (FIG. 6) can be used instead of the elements 7, 8, 9 in FIGS. 4 and 5 to form the desired field current value for the desired flux value $\psi^*$ from the desired or actual values of the stator current (see discussion below in connection with FIG. 11). Alternatively, the same arrangement can be used generally as a circuit model for determining the field current that corresponds to a given flux.

Figure 7:
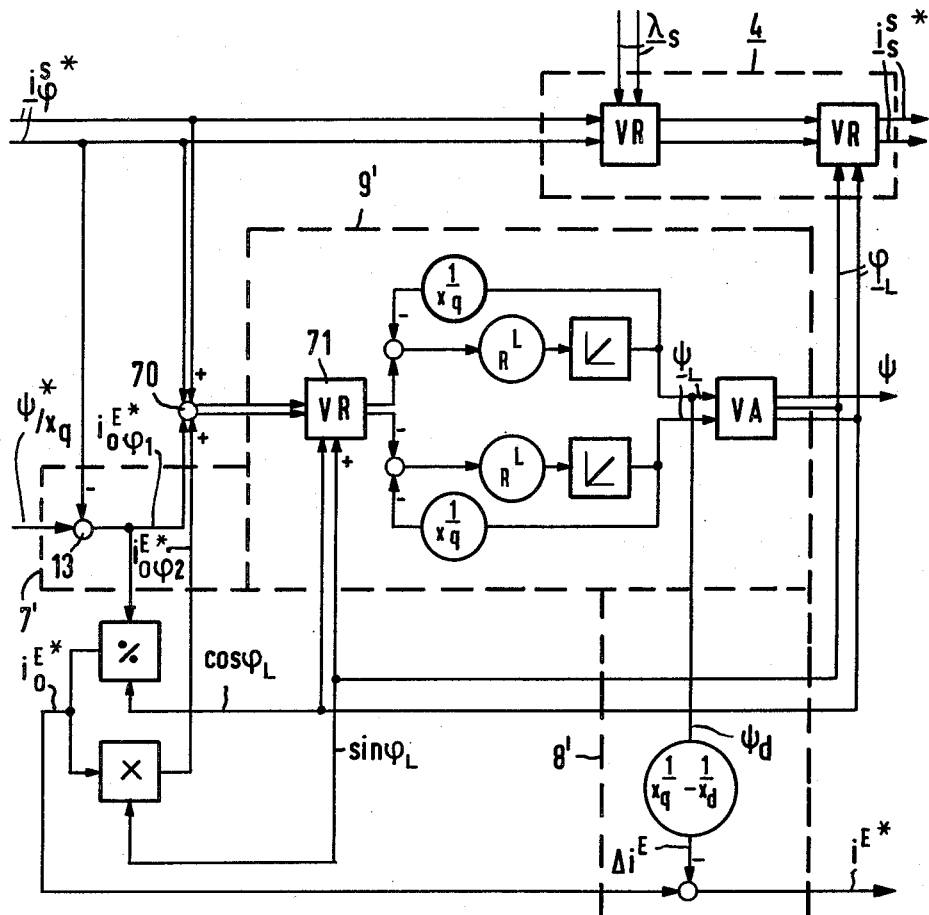
FIG. 7 is a schematic view of a further modified form of the apparatus of FIG. 5.

FIG. 7 shows a modified form of the circuitry of FIG. 6, in which the two components $i_{\phi 1}^{E^*} = i_0^{E^*} \cdot \cos \phi_L$ and $i_{0\phi 2}^{E^*} = i_0^{E^*} \cdot \sin \phi_L$ of the field current, rather than the magnitude $i_0^{E^*}$ of the fictitious field current are supplied as the field current value to the flux determining system 9'. Adding these components to the components of the field-oriented stator current $i_\phi^{S^*}$ at an addition stage 70 serves to form a field-oriented current vector. This vector is then transformed into the rotor-oriented reference system by the vector rotator 71. The circuit arrangement 9' of FIG. 7 determines for the fictitious field current value the corresponding flux of a likewise fictitious nonsalient-pole machine, with $X = X_q$. Surprisingly, this flux is a simulation of the (true) flux $\psi$ corresponding to the true field current $i^E$, or respectively $i^{E^*}$. Thus, the circuit arrangement 9' shown in FIG. 7 can serve the same function as the flux determining system 9 of FIG. 4. The circuit arrangement 9' can also be used generally as a circuit arrangement for the simulation of a flux model value within a circuit model comprising elements 7', 8', 9' such as previously described above with reference to FIG. 6. It must be assured, however, that the stator current input in field-oriented form corresponds to the actual current, represented in field-oriented coordinates, of the machine correlated with the circuit model. Since the circuit arrangements of FIGS. 6 and 7 utilize the symmetrical inductance parameter $X_q$, pertinent differential equations can be solved in the field-oriented system as stated with reference to FIG. 5 of copending U.S. patent application Ser. No. 279,352.

Figure 8:
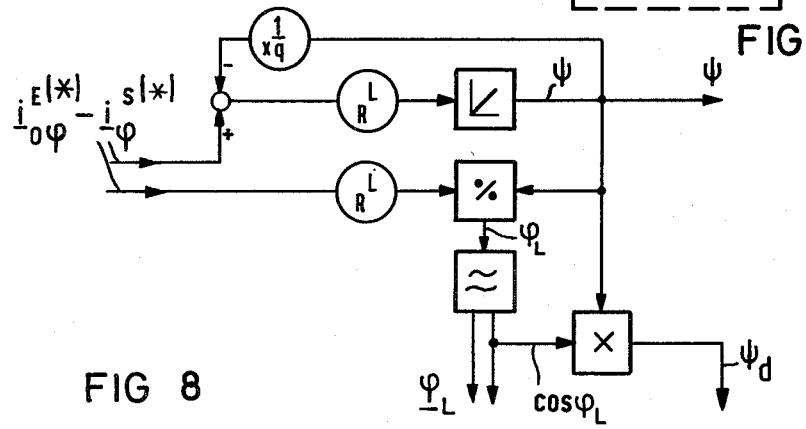
FIG. 8 is a schematic view of a circuit arrangement usable for flux determination in the apparatus of FIG. 7.

FIG. 8 shows another form of flux simulating circuitry corresponding to the circuit 9' of FIG. 7. The input vector of the circuit of FIG. 8 is the vector $i_{0\phi}^{E^*} - i_\phi^{S^*}$ formed from the desired values $i^{S^*}$ and $\psi^*/X_q$ at the addition stage 70 (FIG. 7). Priming the control apparatus by means of desired parameter values is advantageous, because it permits the construction of a compact control device for controlling the operation of a salient-pole machine which is functional immediately upon being supplied with the desired values, and can be operated without the associated salient-pole machine. If the fictitious field current value is formed from the true field current by adding a correction factor $\Delta i^E$ determined with the aid of the circuit 9' (instead of deriving it from the desired flux value), an arrangement is obtained whereby the flux can be determined from the fed-in actual or desired values of the stator current, from the rotor resistance and from a preset magnitude of the true field current as well as from an inductance parameter correlated with the main inductance. Such an arrangement can be employed, therefore, as a flux determining system, fed with the actual values, of a salient-pole machine in the apparatus shown in FIG. 2. It may also be advantageous as a corresponding current model of a salient-pole-machine for other uses, even if the field current is not to be precontrolled by it (see U.S. patent application Ser. No. 279,352). A circuit model of the latter type is shown in FIG. 9.

Figure 9:
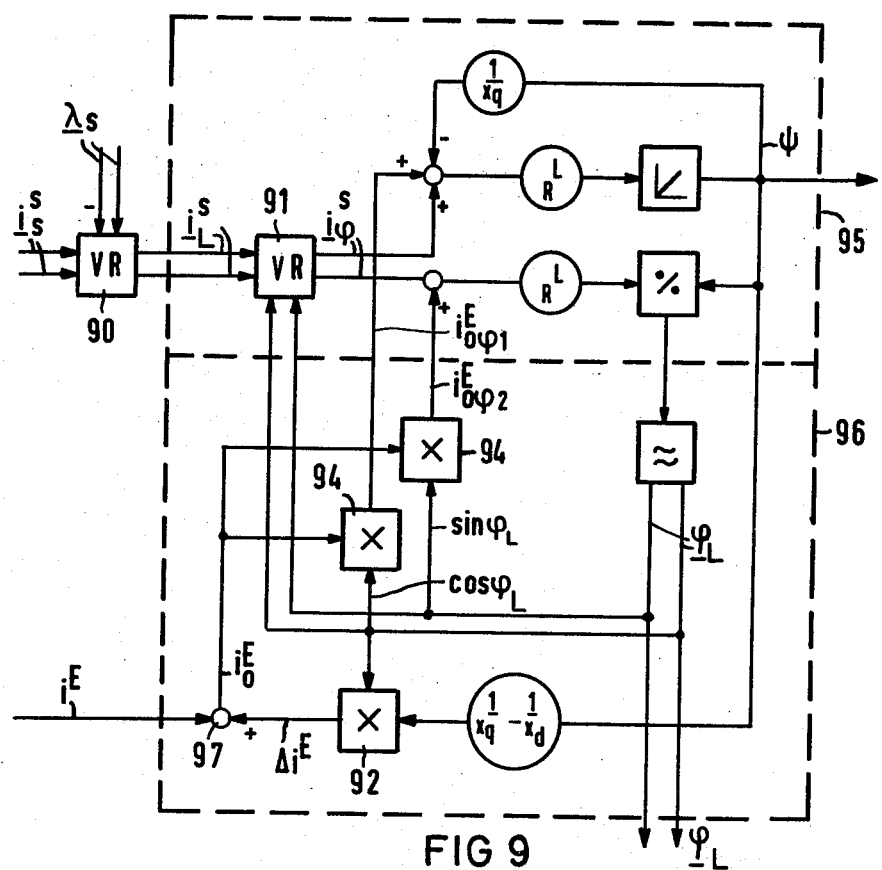
FIG. 9 is a schematic view of a further modified form of a flux determining system operating as a mathematical model circuit in the field-oriented reference system.

The circuit shown in FIG. 9 operates as a circuit model for salient-pole machines. It comprises a circuit arrangement 95 which simulates a flux model value (i.e. magnitude $\psi$ and direction $\phi_L$) from fed-in values for the stator current $i_L^S$ (if measured values for the phase currents are taken as the basis, a transformation into the rotor reference system—vector rotator 90 fed with the rotor position angle $\lambda_S$—is always possible), the rotor resistance $R^L$ and an inductance parameter which is correlated to the main field inductance, and a "fictitious" field current value $i_{0\phi}^E$. As a preferred inductance parameter X (an inductance parameter correlated with a non salient-pole machine $X = $const), the shunt inductance of the salient-pole machine $X_q$ is used. The field current value $i^E_{0\phi}$ is determined as shown in FIG. 9 by a computing element 96 based on the preset variable of the ("true") field current ($i^E$) and of a correction factor ($\Delta i^E$) composed of the flux model value and parameters for the series inductance $X_d$ and for the shunt inductance $X_q$ of the salient-pole machine. In the preferred embodiment shown (FIG. 9), the correction factor $\Delta i^E$ is derived from the product of the longitudinal component of the model flux (multiplier 92 for the formation of $\psi_d = \psi \cdot \cos \phi_L$) and the difference $(1/X_q) - (1/X_d)$ between the reciprocals of the longitudinal and transverse components of the main inductance. This factor is then additively applied to the preset (true) field current $i^E$ at addition element 97.

In the embodiment of FIG. 9, the field-oriented fictitious field current, $i_{0\phi}^E = (i_0^E \cdot \cos \phi_L, i_0^E \cdot \sin \phi_L)$ is formed from the magnitude $i_0^E$ of the fictitious field current $i_0^E$ by means of the multipliers 94. The components of the current $i_0^E$ are then combined with the components of the stator current $i_\phi^S$ (preset in field-oriented form by the vector rotator 91) to form the total flux flow, from which, as described with reference to FIG. 8, the model flux magnitude $\psi$ and the model flux angle $\phi_L$ are determined.

Figure 10:
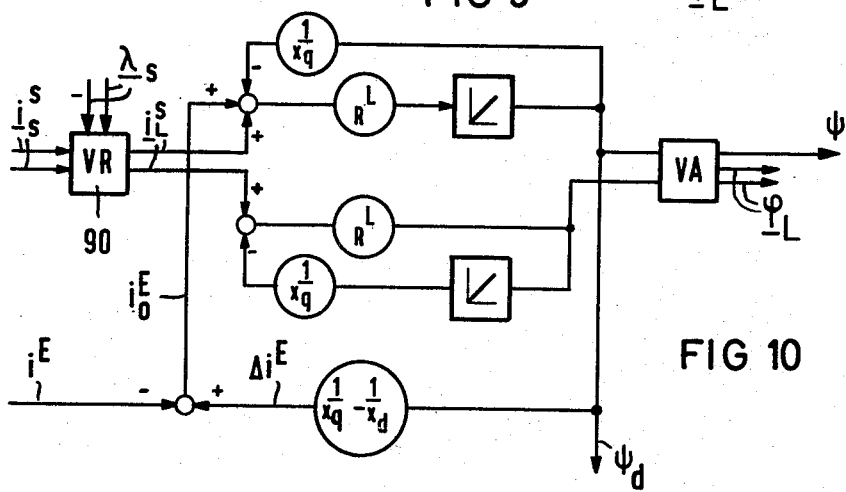
FIG. 10 is a schematic view of a rotor-oriented computing model circuit corresponding to FIG. 9.

Alternatively, for flux simulation according to FIG. 6, a rotor-oriented mode can be adopted as shown by the circuitry in FIG. 10. This eliminates the need for the elements 91, 92, 94 used for the formation of the field-oriented components. Either of the circuit models of FIGS. 9 and 10 can be used directly as the flux determining system 9 in FIG. 2. They may also be used, without the vector rotator 90 and with the desired stator current vector instead of the actual vector, for the same purpose in the circuitry of FIG. 4. Since, especially with a field-oriented control as illustrated in FIGS. 2 and 4 to 7, the stator current is preset in the stator current control device 4 in field-oriented desired components $i_{\phi 1}^{S*}$, $i_{\phi 2}^{S*}$ anyway, it is advisable to feed the desired stator current vector to the flux determining system also in field-oriented form. When using the circuit model of FIG. 9 as the flux determining system, this eliminates the need for the vector rotators 90 and 91.

Figure 11:
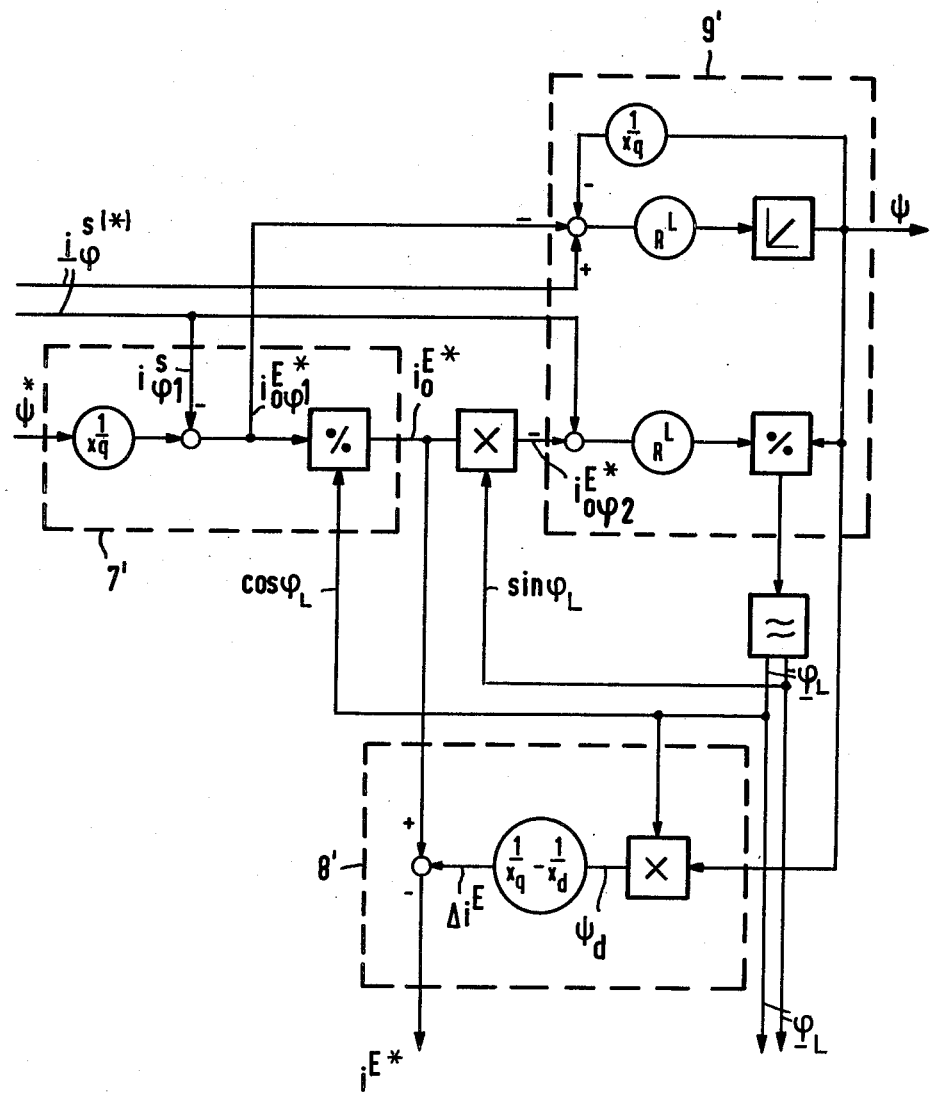
FIG. 11 is a schematic view of another circuit model for the determination of the field current belonging to a given flux.

Lastly there is shown in FIG. 11 a further circuit model which, using the circuit arrangement shown in FIG. 8 at the fed-in actual or desired stator current value, determines the field current associated with a given flux $\psi^*$. The elements 7', 8' and 9' of FIG. 11 correspond to the elements 7', 8' and 9' of FIG. 6.

An advantage of the circuit model shown in FIGS. 6 to 11 is that the simulation of a nonsalient-pole machine, as known and in use in corresponding circuit models and controls for nonsalient-pole machines, can be used as the circuit arrangement 9' or 95 which serves to simulate the dynamics of a salient-pole machine. It is thus not necessary to construct a separate circuit arrangement for a salient-pole machine. Thus, e.g. for an "actual flux value computer" for determining the actual flux value from the actual values of stator current and field current (FIGS. 9 and 10) or for a "desired field current value computer" for determining the desired field current value belonging to a preset desired flux value from the actual values or from the desired values of the stator current controlling the actual values (FIGS. 6, 7 and 11), it is possible to use existing nonsalient-pole machine circuit arrangements. The only modification necessary is to supplement the pole characteristic of the machine by the addition of a correction factor $\Delta i^E$ at the field current input or output.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto. It will be appreciated that the selection, connection and layout of the various components of the described configurations may be varied to suit individual tastes and requirements.

What is claimed is:

1. A device to control a salient pole machine comprising:
   (a) a flux computation device to compute the instantaneous flux of the machine;
   (b) a stator-current control device, connected with the flux computation device, to generate a stator-current control signal;
   (c) a stator-current actuator to feed a stator current to the stator of the machine, on the basis of the stator-current control signal;
   (d) an exciting-current control device, comprising:
      (1) an inlet connected with the flux computation device,
      (2) an inlet for the input of a standard flux value,
      (3) computing elements which compute, from the instantaneous flux of the machine, the standard flux value and an inductance parameter assigned to the main inductance of a non-salient pole machine, an exciting-current value that is mathematically assigned to the non-salient pole machine, with the value of the shunt inductance of the salient pole machine being fed into the computing elements as an inductance parameter, and
      (4) an outlet for the computed exciting-current value as an exciting-current control signal;
   (e) a preliminary control stage which computes, from the longitudinal component of the instantaneous flux computed in the flux computation device and a correction factor computed from parameters for the series and shunt inductances of the salient pole machine, a disturbance variable, which is switched to the exciting-current control signal to correct the rotor asymmetry; and
   (f) an exciting-current actuator to feed a controlled exciting current to the rotor of the machine, on the basis of the corrected exciting-current control signal.

2. Apparatus as defined in claim 1, wherein the correction factor is derived from the product of the longitudinal component of the flux and the difference between the reciprocals of the parameters for the shunt and series inductances.

3. Apparatus as defined in claim 2, wherein the field current control signal is formed by subtracting the correction factor from the field current value signal.

4. Apparatus as defined in claim 3, wherein the field current final control element further comprises a field current regulator connected to receive the field current value signal, the value of the actual machine field current and the correction factor.

5. Apparatus as defined in claim 1, wherein the flux determining system contains a circuit model for simulating the flux from fed-in values for the stator current, the field current, the rotor position picked off at a magnet wheel position transmitter, and the main field inductance.

6. Apparatus as defined in claim 5, wherein the fed-in value for the stator current is the desired stator current value, for the field current is the field current value formed by the field current control element, and for the main inductance is the shunt inductance parameter.

7. Apparatus as defined in claim 6, wherein the desired stator current value is preset in the flux determining system in field-oriented form.

8. Apparatus as defined in claim 1, wherein the field current control element forms the difference of the quotient of the desired flux value and the shunt inductance on the one hand minus the field-parallel stator current component, on the other, and supplies it to the divident input of a division element whose divisor input is energized by the cosine of the flux determined by the flux determining system.

9. Apparatus as defined in claim 7, wherein the field-oriented components of a desired stator current vector are used as the desired value of the stator current and wherein the stator current control system includes a vector rotator which is energized by an angle signal formed by the flux determining system, for the flux angle, and transforms the field-oriented desired vector into a stator-oriented reference system.

10. A circuit model for determining the flux, belonging to a preset value of the field current, of a salient-pole machine, with a circuit arrangement which, from fed-in values for the stator current, for the rotor resistance and for an inductance parameter correlated with the main inductance and from a field current value simulates the flux as model value, characterized in that there is fed into the circuit arrangement as inductance parameter an inductance parameter correlated with a nonsalient-pole machine, and that at the feed input for the field current value a computing element is provided which determines the field current value to be fed into the circuit arrangement from the present field current value and from a disturbance variable composed of the flux model value and parameters for the series inductance and shunt inductance of the salient-pole machine.

11. A circuit model as defined in claim 10, characterized in that there is fed into the circuit arrangement as inductance parameter correlated with the nonsalient-pole machine the shunt inductance of the salient pole machine, and that for the formation of the disturbance variable there is formed the product of the longitudinal component of the flux times the difference of the reciprocal longitudinal component and transverse component of the main inductance, and the disturbance variable is additively applied to the preset field current input value.

12. A circuit model as defined in either of claims 10 or 11 usable as a flux determining system for the field-oriented control of a salient-pole machine wherein the actual field current is used as the preset field current value and the actual stator current is used as the fed-in value for the stator current.

13. A circuit model for determining the value, belonging to a given flux, of the field current of a salient-pole machine, with a circuit arrangement which from fed-in values for the stator current for the rotor resistance and for an inductance parameter correlated with the main inductance as well as from a field current value simulates a flux model value, characterized in that there is fed into the circuit arrangement as inductance parameter an inductance parameter correlated with a nonsalient-pole machine, that at the feed input for the field current value a computing element is connected which determines the field current value to be fed into the circuit arrangement from the preset flux and from the fed-in values for stator current and for the inductance parameter correlated with the nonsalient-pole machine, and that an output stage is provided which determines the magnitude of the field current value belonging to the preset flux from the fed-in field current value and from a disturbance variable composed of the flux model value and parameters for the series and shunt inductance of the salient-pole machine.

14. A circuit model as defined in claim 13, characterized in that there is fed into the circuit arrangement and into the computing element as inductance parameter correlated with the nonsalient-pole machine the shunt inductance of the salient-pole machine, that for the formation of the disturbance variable the product of the longitudinal component of the model flux times the difference of the reciprocal longitudinal component minus transverse component of the mail field inductance of the salient-pole machine is formed, and that the disturbance variable is subtractively applied to the exciting current value.

15. A circuit model as defined in either claim 13 or 14, usable as flux determining system, field current control element and anticipating control stage for the field-oriented control or regulation of a salient-pole machine.

16. Apparatus for the formation of a field current control signal for a salient-pole machine, comprising circuitry means for forming a fictitious field current value signal representing the field current control signal corresponding to a preset desired flux value which would be used to control a hypothetical nonsalient-pole machine having similar parameters to those of the salient-pole machine;

circuitry means for modifying the fictitious field current value signal by a correction factor which compensates for the deviation in operation of the salient-pole machine from the hypothetical nonsalient-pole machine, to give the field current control signal for the salient-pole machine.

17. Aparatus as defined in claim 16, wherein the forming means comprises means for forming the fictitious field current value signal by neglecting the asymmetry of the main field inductance of the salient-pole machine and calculating the fictitious value using only the shunt inductance as an inductance parameter input.

18. Apparatus as defined in claim 16 or 17, wherein the modifying means comprises means for modifying the fictitious field current value signal by a correction factor developed from the longitudinal value of the machine flux and the shunt and series inductance parameters of the salient-pole machine.

19. Apparatus as defined in claim 18, wherein the modifying means comprises means for modifying the fictitious field current value signal by a correction factor developed from the product of the longitudinal flux component and the difference in the reciprocals of the two inductance parameters.

* * * * *